United States Patent
Gustafson

(10) Patent No.: US 9,429,494 B1
(45) Date of Patent: Aug. 30, 2016

(54) LEAKAGE TEST METHOD FOR A HERMETICALLY SEALED DISK DRIVE ENCLOSURE

(71) Applicant: Western Digital Technologies, Inc., Irvine, CA (US)

(72) Inventor: John R. Gustafson, Los Gatos, CA (US)

(73) Assignee: Western Digital Technologies, Inc., Irvine, CA (US)

(*) Notice: Subject to any disclaimer, the term of this patent is extended or adjusted under 35 U.S.C. 154(b) by 642 days.

(21) Appl. No.: 13/684,004

(22) Filed: Nov. 21, 2012

(51) Int. Cl.
   *G01M 3/00* (2006.01)
   *G01M 3/22* (2006.01)
   *G01M 3/20* (2006.01)

(52) U.S. Cl.
   CPC ............. *G01M 3/226* (2013.01); *G01M 3/202* (2013.01)

(58) Field of Classification Search
   CPC ............................. G01M 3/202; G01M 3/226
   USPC ............ 73/40.7, 40–41.4, 45–48, 49.2, 49.3, 73/52; 356/432–434, 436, 437, 440
   See application file for complete search history.

(56) References Cited

U.S. PATENT DOCUMENTS

| | | | |
|---|---|---|---|
| 4,419,882 A | 12/1983 | Ishii et al. | |
| 4,608,866 A | 9/1986 | Bergquist | |
| 4,776,207 A | 10/1988 | Holme | |
| 5,454,157 A | 10/1995 | Ananth et al. | |
| 6,959,586 B2 | 11/2005 | Watts et al. | |
| 7,062,387 B1 | 6/2006 | Burns et al. | |
| 7,274,534 B1 | 9/2007 | Choy et al. | |
| 7,299,681 B2 | 11/2007 | Cummings | |
| 7,434,987 B1 | 10/2008 | Gustafson et al. | |
| 2003/0021054 A1* | 1/2003 | Feliss et al. | 360/69 |
| 2003/0026033 A1* | 2/2003 | Fioravanti et al. | 360/75 |
| 2003/0179489 A1 | 9/2003 | Bernett et al. | |
| 2010/0199748 A1* | 8/2010 | Martino | 73/40.7 |
| 2011/0212281 A1* | 9/2011 | Jacoby et al. | 428/35.8 |
| 2012/0137751 A1 | 6/2012 | Brown et al. | |

OTHER PUBLICATIONS

U.S. Appl. No. 12/714,297, filed Feb. 26, 2010, 15 pages.

* cited by examiner

*Primary Examiner* — Peter Macchiarolo
*Assistant Examiner* — Alexander Mercado

(57) ABSTRACT

A method to test for leakage of an enclosure of a hermetically sealed disk drive is disclosed. The method includes filling the disk drive enclosure with a gas mixture that includes a tracer gas. The tracer gas may comprise helium gas or hydrogen gas, and constitute between 1% and 10% of the gas mixture. The method includes hermetically sealing the disk drive enclosure. The method also includes testing for the presence of the tracer gas outside of the disk drive enclosure.

15 Claims, 5 Drawing Sheets

400

412
Introduce at least 0.5 atmospheres partial pressure of air or neon (as a main gas) into a disk drive enclosure.

414
Introduce a minority amount of helium (as a tracer gas) into the disk drive enclosure, to obtain a gas mixture that includes no more than 0.2 atmospheres partial pressure of helium.

416
Hermetically seal the disk drive enclosure by adhering a metal foil to the exterior of the disk drive enclosure.

418
Test for the presence of helium outside of the disk drive enclosure by using a mass spectrometer to analyze a sample of atmosphere from outside of the disk drive enclosure.

FIG . 4

LEAKAGE TEST METHOD FOR A HERMETICALLY SEALED DISK DRIVE ENCLOSURE

BACKGROUND

The typical hard disk drive includes a head disk assembly (HDA) and a printed circuit board assembly (PCBA) attached to a disk drive base of the HDA. The HDA includes at least one disk (such as a magnetic disk, magneto-optical disk, or optical disk), a spindle motor for rotating the disk, and a head stack assembly (HSA). The PCBA includes electronics and firmware for controlling the rotation of the spindle motor and for controlling the position of the HSA, and for providing a data transfer channel between the disk drive and its host.

The spindle motor typically includes a rotor including one or more rotor magnets and a rotating hub on which disks are mounted and clamped, and a stator. If more than one disk is mounted on the hub, the disks are typically separated by spacer rings that are mounted on the hub between the disks. Various coils of the stator are selectively energized to form an electromagnetic field that pulls/pushes on the rotor magnet(s), thereby rotating the hub. Rotation of the spindle motor hub results in rotation of the mounted disks.

The HSA typically includes an actuator, at least one head gimbal assembly (HGA), and a flex cable assembly. During operation of the disk drive, the actuator must rotate to position the HGAs adjacent desired information tracks on the disk. The actuator includes a pivot-bearing cartridge to facilitate such rotational positioning. The pivot-bearing cartridge fits into a bore in the body of the actuator. One or more actuator arms extend from the actuator body. An actuator coil is supported by the actuator body, and is disposed opposite the actuator arms. The actuator coil is configured to interact with one or more fixed magnets in the HDA, to form a voice coil motor. The PCBA provides and controls an electrical current that passes through the actuator coil and results in a torque being applied to the actuator.

Each HGA includes a head for reading and writing data from and to the disk. In magnetic recording applications, the head typically includes a slider and a magnetic transducer that comprises a writer and a read element. In optical recording applications, the head may include a mirror and an objective lens for focusing laser light on to an adjacent disk surface. The slider is separated from the disk by a gas lubrication film that is typically referred to as an "air bearing." The term "air bearing" is common because typically the lubricant gas is simply air. However, air bearing sliders have been designed for use in disk drive enclosures that contain an alternative gas (e.g. nitrogen) that may not degrade lubricants and protective carbon films as quickly as does a gas like air that contains oxygen.

Disk drive enclosures disclosed in the art to contain an alternative gas are typically hermetically sealed to prevent an unacceptable rate of leakage that might undesirably alter the tribochemistry of the head disk interface, possibly leading to degradation in reliability, head crashes, and associated data loss. Hermetically sealing a disk drive may also beneficially prevent large changes in moisture and humidity within the disk drive.

Various methods and structures that have been disclosed in the past to hermetically seal disk drive enclosures. The evaluation and further improvement of such methods and structures depends, in part, on practical and sensitive leakage testing. However, conventional methods to test for leakage from a hermetically sealed disk drive have required the addition of components and cost to the disk drive devices, and/or have not been sensitive enough to quickly and reliably identify slow or minor leaks that still might ultimately reduce disk drive lifespan months or years later.

Thus, there is a need in the art for an improved method to test for leakage of a hermetically sealed disk drive enclosure, which may be practically implemented and integrated in a high volume and low cost disk drive manufacturing process, and which is sensitive enough to ensure adequate post-manufacture product reliability and lifetime.

BRIEF DESCRIPTION OF THE DRAWINGS

FIG. 4 is a flow chart depicting a method according to an embodiment of the present invention.

DESCRIPTION OF EXAMPLE EMBODIMENTS

Figure 1A:
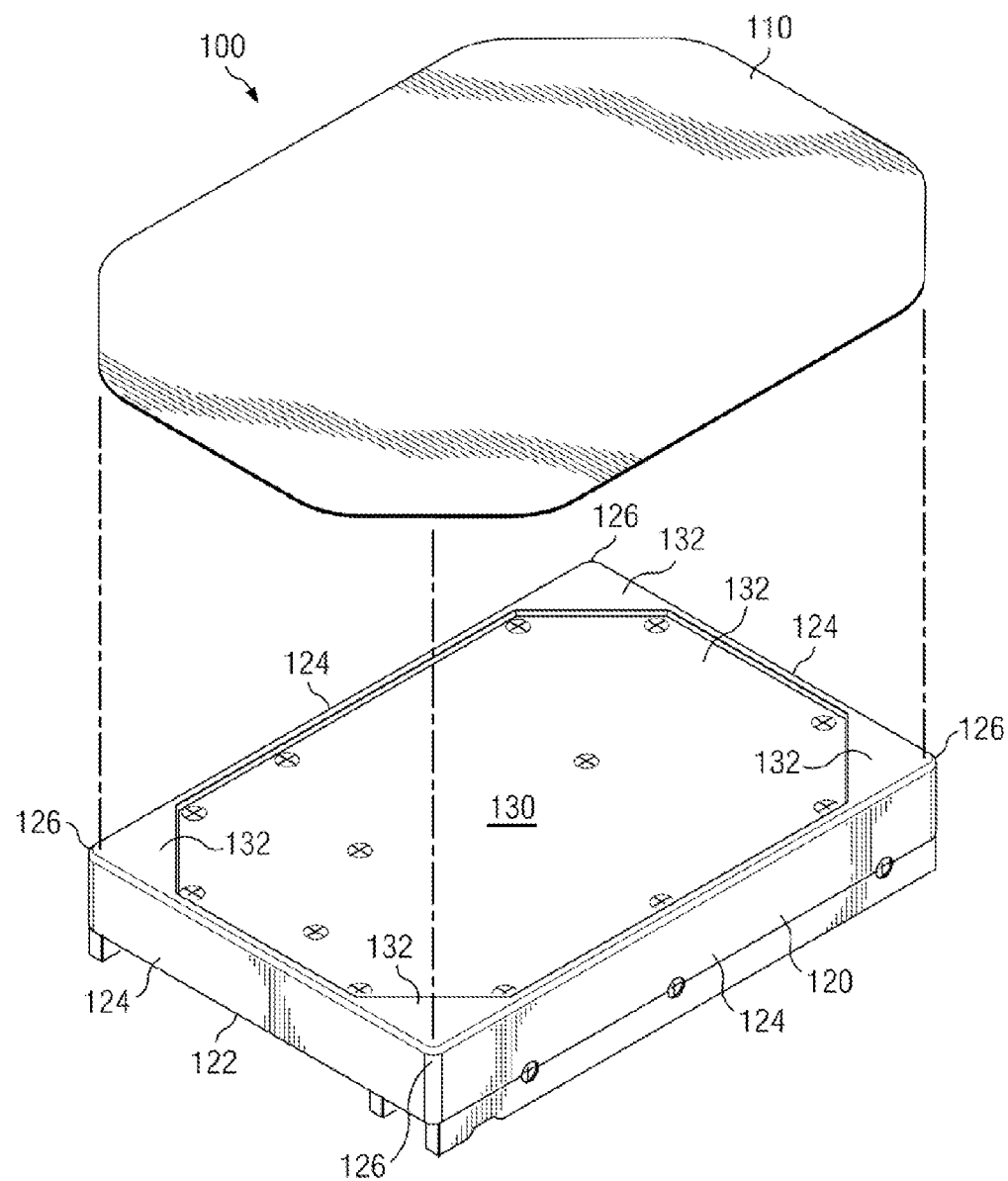
FIG. 1A is an exploded perspective view of a disk drive including a metal foil cover seal capable of use with a method according to an embodiment of the present invention.

FIG. 1A is an exploded perspective view of a hermetically sealed disk drive 100 capable of use with a method according to an embodiment of the present invention. The disk drive 100 includes a disk drive enclosure that may include a metal foil cover seal 110, a disk drive base 120, and a top cover 130. The metal foil cover seal 110 may be a pure metal or metal alloy foil that includes copper, aluminum, stainless steel, tin, lead, and/or gold, for example, having a thickness chosen so that small pores and/or imperfections in the metal foil will be unlikely to pass all the way through the layer. The metal foil cover seal 110 may include an adhesive layer with thermal set epoxy adhesive or an acrylic pressure sensitive adhesive, for example. In the example of FIG. 1A, the disk drive base 120 includes a bottom face 122 and four side faces 124. In the example of FIG. 1A, the enclosure of disk drive 100 has a top face 132 that includes an upper surface of the top cover 130, and that includes the upper surface of the disk drive base 120 near its four corners 126.

Figure 1B:
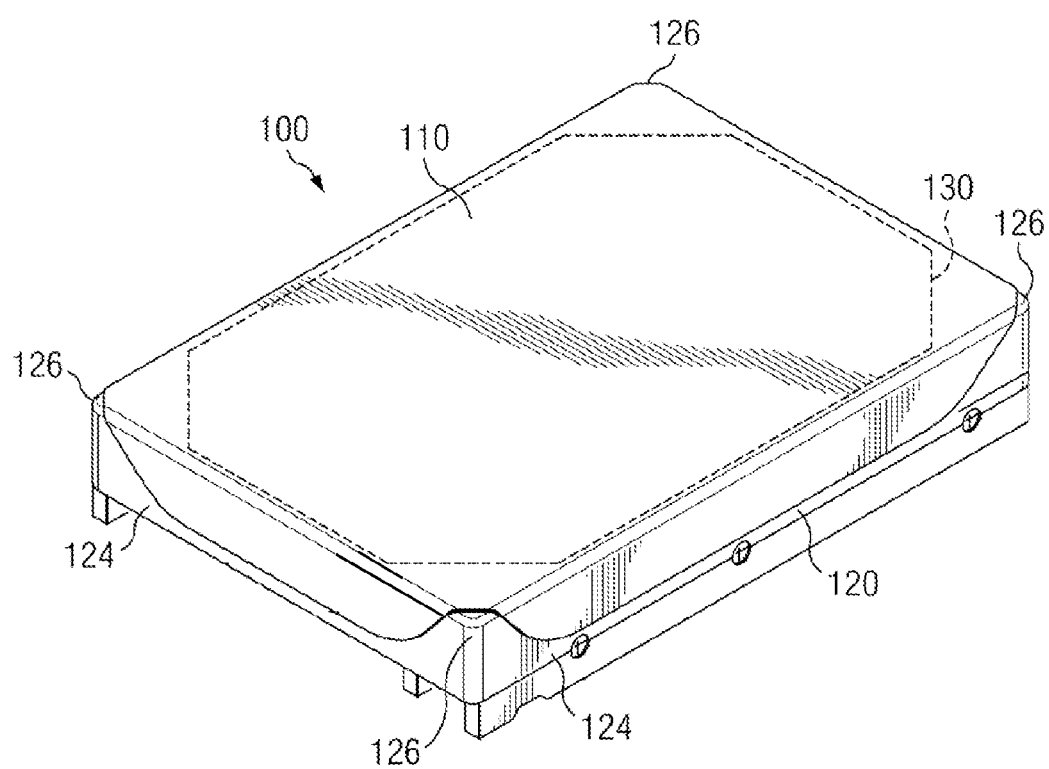
FIG. 1B is a perspective view of the disk drive of FIG. 1A, with the metal foil cover seal adhered in place.

FIG. 1B is a perspective view of the disk drive 100 of FIG. 1A, with the metal foil cover seal 110 adhered in place. Now referring additionally to FIG. 1B, the metal foil cover seal 110 may conform to the disk drive enclosure, and may substantially cover and be adhered to the top face 132, and may overlap and be adhered to the side faces 124. The disk drive 100 may optionally include a conventional magnetic recording head that directs laser light to heat a small region on a surface of a disk media during write operations (i.e. so-called "energy assisted magnetic recording" technology, a.k.a. "EAMR" technology).

Figure 2:
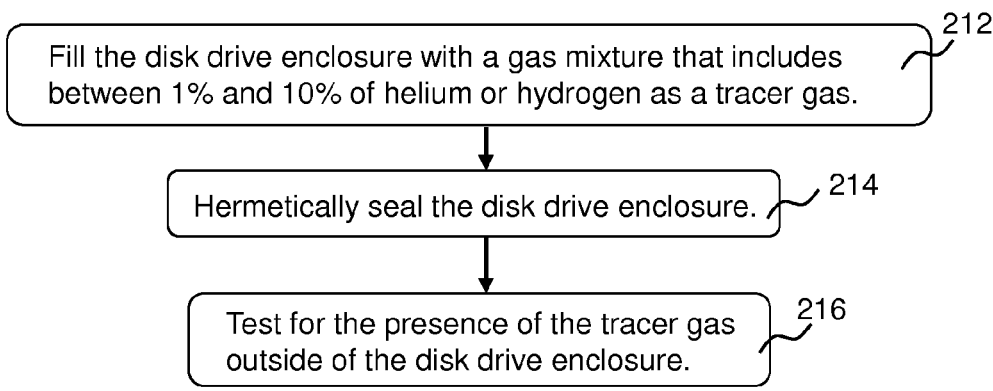
FIG. 2 is a flow chart depicting a method according to an embodiment of the present invention.

FIG. 2 is a flow chart depicting a method 200 according to an embodiment of the present invention. In step 212 of the embodiment of FIG. 2, the disk drive enclosure is filled with a gas mixture that includes between 1% and 10% of helium or hydrogen as a tracer gas. For example, in certain embodiments the gas mixture in the disk drive enclosure preferably includes no more than 0.2 atmospheres partial pressure of the tracer gas, and at least 0.5 atmospheres partial pressure of the main gas (e.g. air, nitrogen, and/or neon gas, which is not the tracer gas). For example, the tracer gas may be mixed with a main gas to obtain the gas mixture, and then the gas mixture may be filled into the disk drive enclosure. Alternatively, a minority amount of the tracer gas may be introduced into the disk drive enclosure (which already includes the main gas).

The foregoing tracer gas concentration ranges may provide a subtle dual advantage in the context of disk drive applications. Specifically, even if such a concentration of tracer gas were to undesirably leak away during protracted field use of a disk drive (that passed the initial leakage testing), the remaining main gas within the disk drive may still be sufficient for proper functioning of the hydrodynamic gas bearing between the read head and the disk. Hence, a tracer gas concentration in the forgoing range may be large enough to initially serve to facilitate leakage testing of adequate sensitivity, and also be small enough to—much later in the lifetime of the disk drive—help avoid a leakage-related "head crash" or data loss. In this way, the foregoing tracer gas concentration range may enhance disk drive data reliability in two ways, both initially during leak testing, and much later in the lifetime of the disk drive.

In step 214 of the embodiment of FIG. 2, the disk drive enclosure is hermetically sealed. For example, a metal foil may be adhered to the exterior of the disk drive enclosure to hermetically seal it, as previously described with reference to FIGS. 1A and 1B. Next, step 216 of the embodiment of FIG. 2 tests for the presence of the tracer gas outside of the disk drive enclosure. For example, a mass spectrometer may be used to analyze a sample of atmosphere (may be an evacuated or partially evacuated atmosphere) from outside of the disk drive enclosure, and thereby test for the presence of the tracer gas outside of the disk drive enclosure. In certain embodiments, such presence may indicate an unacceptably high leak rate from the disk drive enclosure.

Various embodiments of the present invention may optionally facilitate the testing and use of a non-oxygen internal disk drive gas mixture within the disk drive, which may improve the lifetime and reliability the disk drive—especially in disk drives that include EAMR technology. In disk drives that utilize EAMR technology, localized laser heating may otherwise cause oxygen in air to undesirably react with chemicals in the disk drive (e.g. oxidize and thereby deplete or undesirably change the chemical properties of lubricant on the disk surface). Because hydrogen gas is more reactive than helium gas, helium gas may be preferred in the embodiment of FIG. 2 if/when applied to EAMR disk drive applications, and other applications where the reactivity of the gas within the disk drive presents a concern.

Figure 3:
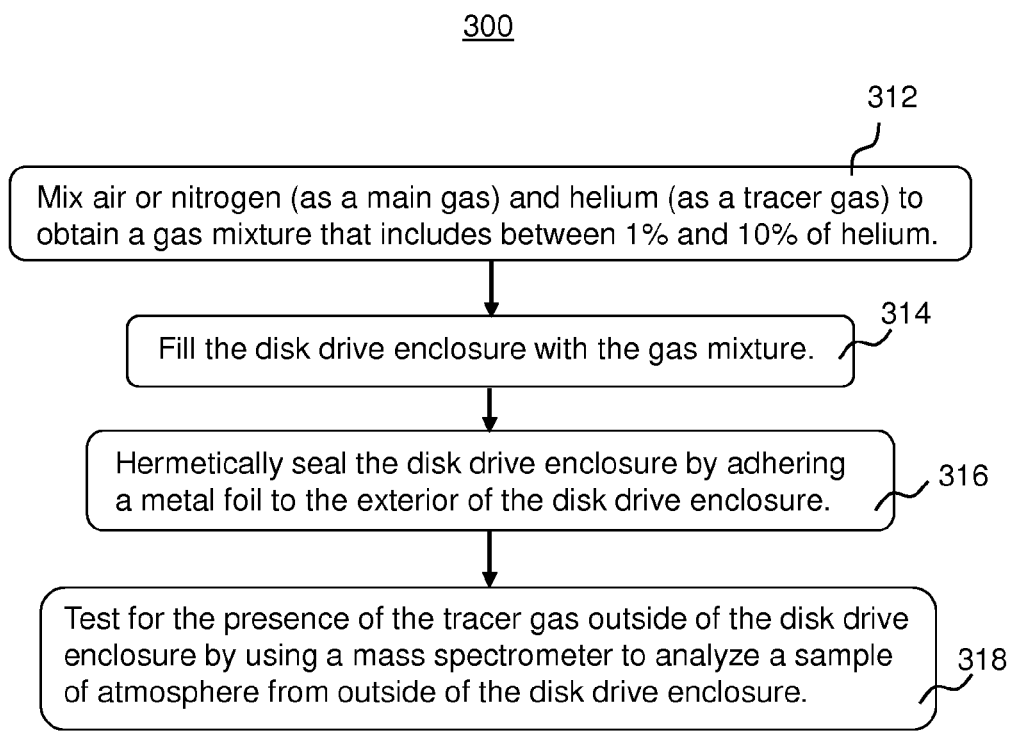
FIG. 3 is a flow chart depicting a method according to an embodiment of the present invention.

FIG. 3 is a flow chart depicting a method 300 according to an embodiment of the present invention. In step 312 of the embodiment of FIG. 3, air or nitrogen (as a main gas) and helium (as a tracer gas) are mixed to obtain a gas mixture that includes between 1% and 10% of helium. In step 314 of the embodiment of FIG. 3, the disk drive enclosure is filled with the gas mixture. In step 316 of the embodiment of FIG. 3, the disk drive enclosure is hermetically sealed by adhering a metal foil to the exterior of the disk drive enclosure. Step 318 of the embodiment of FIG. 3 tests for the presence of the tracer gas outside of the disk drive enclosure by using a mass spectrometer to analyze a sample of atmosphere from outside of the disk drive enclosure. In certain embodiments, such presence may indicate an unacceptably high leak rate from the disk drive enclosure.

FIG. 4 is a flow chart depicting a method 400 according to an embodiment of the present invention. In step 412 of the embodiment of FIG. 4, at least 0.5 atmospheres partial pressure of air or neon (as a main gas) is introduced into a disk drive enclosure. In step 414 of the embodiment of FIG. 4, a minority amount of helium (as a tracer gas) is introduced into the disk drive enclosure, to obtain a gas mixture that includes no more than 0.2 atmospheres partial pressure of helium. In step 416 of the embodiment of FIG. 4, the disk drive enclosure is hermetically sealed by adhering a metal foil to the exterior of the disk drive enclosure. Step 418 of the embodiment of FIG. 4 tests for the presence of the tracer gas outside of the disk drive enclosure by using a mass spectrometer to analyze a sample of atmosphere from outside of the disk drive enclosure. In certain embodiments, such presence may indicate an unacceptably high leak rate from the disk drive enclosure.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

I claim:

1. A method to test for leakage of a hermetically sealed disk drive enclosure, the method comprising:
   filling the disk drive enclosure with a gas mixture that includes a tracer gas selected from the group consisting of helium gas and hydrogen gas, the tracer gas constituting between 1% and 10% of the gas mixture;
   hermetically sealing the disk drive enclosure; and
   testing for the presence of the tracer gas outside of the disk drive enclosure.

2. The method of claim 1 wherein filling the disk drive enclosure with the gas mixture comprises: mixing the tracer gas with a main gas to obtain the gas mixture, and then filling the gas mixture into the disk drive enclosure.

3. The method of claim 2 wherein the main gas is air.

4. The method of claim 2 wherein the main gas comprises nitrogen gas.

5. The method of claim 2 wherein the main gas comprises neon gas.

6. The method of claim 1 wherein filling the disk drive enclosure with the gas mixture comprises: introducing a minority amount of the tracer gas into the disk drive enclosure which already includes a main gas.

7. The method of claim 6 wherein the main gas is air.

8. The method of claim 6 wherein the main gas comprises nitrogen gas.

9. The method of claim 6 wherein the main gas comprises neon gas.

10. The method of claim 1 wherein the tracer gas is helium gas.

11. The method of claim 10 wherein the disk drive includes a magnetic recording head that directs laser light to heat a small region on a surface of a disk media during write operations.

12. The method of claim 1 wherein hermetically sealing the disk drive enclosure comprises adhering a metal foil to the exterior of the disk drive enclosure.

13. The method of claim 1 wherein after hermetically sealing the disk drive enclosure, the gas mixture in the disk drive enclosure includes no more than 0.2 atmospheres partial pressure of the tracer gas.

14. The method of claim 11 wherein the gas mixture in the disk drive enclosure includes at least 0.5 atmospheres partial pressure of a main gas that is not the tracer gas.

15. The method of claim 1 wherein testing for the presence of the tracer gas outside of the disk drive enclosure comprises using a mass spectrometer to analyze a sample of atmosphere from outside of the disk drive enclosure.

* * * * *